United States Patent [19]
Sumi et al.

[11] Patent Number: 5,399,374
[45] Date of Patent: Mar. 21, 1995

[54] COLOR FILTER AND THE MANUFACTURING METHOD THEREFOR

[75] Inventors: Takao Sumi, Kyoto; Tenri Isoda, Otsu; Yoshihide Inako, Nishinomiya; Masahiro Nishida, Ibaraki, all of Japan

[73] Assignee: Nissha Printing Co., Ltd., Kyoto, Japan

[21] Appl. No.: 58,673

[22] Filed: May 10, 1993

Related U.S. Application Data

[60] Continuation of Ser. No. 598,052, Oct. 9, 1990, abandoned, which is a division of Ser. No. 275,179, Sep. 27, 1988, abandoned.

[30] Foreign Application Priority Data

Jan. 28, 1987 [JP] Japan .................. 62-17788

[51] Int. Cl.⁶ .............................................. B05D 1/00
[52] U.S. Cl. .............................. 427/162; 427/168; 427/169; 427/304; 427/443.1; 359/890; 359/891
[58] Field of Search ............ 427/304, 306, 162, 168, 427/169, 443.1; 359/891, 890

[56] References Cited

U.S. PATENT DOCUMENTS

| | | | |
|---|---|---|---|
| 3,562,038 | 2/1971 | Shipley | 427/306 |
| 3,997,810 | 12/1976 | Tsutsui | 313/384 |
| 4,217,182 | 8/1980 | Cross | 427/306 |
| 4,697,923 | 10/1987 | Jones | 356/239 |
| 4,744,635 | 5/1988 | Takaochi | 359/885 |
| 4,751,172 | 6/1988 | Rodriguez | 430/318 |
| 4,759,952 | 7/1988 | Brasch | 427/306 |
| 4,761,304 | 8/1988 | Brasch | 427/306 |
| 4,776,671 | 10/1988 | Sumi | 359/885 |
| 4,846,556 | 7/1989 | Haneda | 359/891 |
| 4,859,571 | 8/1989 | Cohen | 427/302 |
| 4,876,167 | 10/1989 | Snow | 430/7 |
| 4,943,606 | 7/1990 | Inoue | 524/424 |
| 4,948,706 | 8/1990 | Sugihara | 430/271 |
| 5,004,672 | 4/1991 | D'Ottavio | 427/98 |

FOREIGN PATENT DOCUMENTS

| | | | |
|---|---|---|---|
| 52-66421 | 1/1979 | Japan . | |
| 58-14869 | 11/1984 | Japan . | |
| 277202 | 11/1989 | Japan | 359/890 |
| WO85/5462 | 12/1985 | WIPO . | |

OTHER PUBLICATIONS

English translation of WO85/05462.
L. M. Miall "A New Dictionary of Chemistry" Interscience Publishing Inc. 1961, p. 27.
R. Grant et al "Chemical Dictionary" McGraw-Hill Co. 1987, p. 370.

*Primary Examiner*—Michael Lusignan
*Assistant Examiner*—Vi Duong Dang
*Attorney, Agent, or Firm*—Wenderoth, Lind & Ponack

[57] ABSTRACT

A color filter in accordance with the present invention comprises an activated film layer (2) arranged on a transparent substrate (1), said activated film layer (2) having a color pattern formed thereon by permeating a dye thereinto, and a thin metal film pattern (3) formed on a portion, of said activated film layer (2), which requires the formation of a black mask. Accordingly, the color filter integrated into various display devices such as a liquid crystal display is capable of displaying an image having a high contrast. Further, a method for forming a color filter in accordance with the present invention comprises the steps of forming an activated film layer (2) on a transparent substrate (1); permeating a dye into said activated film layer (2) to form a color pattern; and performing an electroless plating to form said thin metal film pattern (3) which functions as a black mask. Accordingly, the method in accordance with the present invention is capable of easily forming a color filter capable of displaying an image having a high contrast.

12 Claims, 4 Drawing Sheets

COLOR FILTER AND THE MANUFACTURING METHOD THEREFOR

This application is a continuation of now abandoned application, Ser. No. 07/598,052, filed Oct. 9, 1990, which is a division of now abandoned application Ser. No. 07/275,179, filed Sep. 27, 1988, which is a national phase of PCT/JP88/00069, filed Jan. 28, 1988.

TECHNICAL FIELD

The present invention relates to a color filter, for use in various display devices such as a liquid crystal display, which is capable of displaying an image having a high contrast, and to a method for forming the color filter.

BACKGROUND ART

Conventionally, in order to obtain an image with a high contrast, it is preferable that a color filter includes a black mask having a light-intercepting performance so that pixels can be filled by the black mask. The black mask is formed either by using a black organic coloring agent or by using a thin metal film. The latter is more favorable than the former because the former is not superior in light-intercepting performance.

One of the methods for forming the color filter having the black mask composed of a thin metal film is as follows: First, a conductive film such as an ITO which can be etched is formed on a transparent substrate such as a glass, and then, the conductive film is etched to be formed into the configuration of the black mask having a predetermined pattern. Thereafter, the black mask is formed on the conductive film by performing an electroless plating using a metal such as nickel. Thereafter, color patterns are laminated on the black mask.

Another method for forming the color filter is as follows: First, a metal such as chromium is sputtered on a transparent substrate to form it into a thin film thereon, and then, the formed thin film is etched to be formed into the configuration of the black mask having a predetermined pattern. Thereafter, color patterns are laminated on the black mask. According to still another method, a resist is formed on portions, of a transparent substrate, which do not require the formation of the black mask, and then, a metal is sputtered into a thin film on the resist, and then, the resist is removed to form a black mask. Thereafter, color patterns are laminated on the black mask.

In the color filters formed according to these methods, the patterns formed on the thin metal films, or the black masks are formed on the transparent substrates directly or through the conductive films. Therefore, the surface of the thin metal film acts as a specular surface, i.e., images displayed on display devices into which the color filters formed according to these methods are integrated are hard to see depending on visual angles.

In addition to the above-described methods, a method for forming a chromium layer consisting of two layers and having a low reflection has been investigated to improve the method for forming the metal layer by sputtering chromium. But this method is also inappropriate for forming a color filter because a glass plate which is a transparent substrate is warped at a high temperature at which such a chromium layer is formed, and moreover, it costs very much to form a color filter by this method.

It is the object of the present invention to overcome the above-described disadvantages and provide a color filter capable of displaying an image having a high contrast and a method for forming the color filter.

DISCLOSURE OF THE INVENTION

A color filter in accordance with the present invention is constructed such that an activated film layer having a color pattern formed by permeating a dye thereinto is formed on the surface of a transparent substrate and a thin metal film pattern is formed on a portion, of the activated film layer, which requires the formation of a black mask. Therefore, the color filter is capable of displaying an image having a high contrast.

A color filter in accordance with the present invention is formed by the following method: An activated film layer is formed on a transparent substrate, and then, a dye permeates into the surface of the activated film layer to form a color pattern. Thereafter, a resist layer is formed at a portion, of the activated film layer, which does not require the formation of the black mask, and then, a solution containing a catalyst is adsorbed by the activated film layer by bringing the catalyst solution into contact with the activated film layer. Thereafter, the transparent substrate is subjected to an electroless plating to form a thin metal film pattern reverse to the pattern of the resist layer, and then, the resist layer is removed. Accordingly, a color filter capable of displaying an image having a high contrast can be easily manufactured.

A color filter in accordance with the present invention is also formed by the following method: An activated film layer is formed on a transparent substrate, and then, a dye permeates into the activated film layer to form a color pattern. Thereafter, a solution containing a catalyst is adsorbed by the activated film layer by bringing the catalyst solution into contact with the activated film layer. Thereafter, the transparent substrate is subjected to an electroless plating to form a thin metal film layer on the activated film layer, and then, a resist layer is formed on a portion, of the thin metal film layer, which requires the formation of a black mask, and the thin metal film layer is etched to form a thin metal film pattern, and then, the resist layer is removed. Accordingly, a color filter capable of displaying an image having a high contrast can be easily manufactured.

According to another method for forming a color filter, an activated film layer is formed on a transparent substrate, and then, a dye permeates into the activated film layer to form a color pattern. Thereafter, a resist layer is formed at a portion, on the activated film layer, which does not require the formation of the black mask. Next, a solution containing a catalyst is adsorbed by the activated film layer by bringing the catalyst solution into contact with the activated film layer so as to remove the resist layer. Thereafter, the transparent substrate is subjected to an electroless plating to form a thin metal film pattern. Accordingly, a color filter capable of displaying an image having a high contrast can be easily manufactured.

Figure 1:
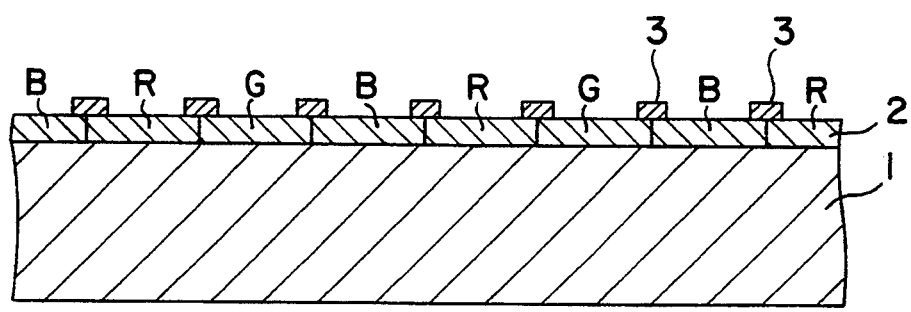
FIG. 1 is a sectional view showing an embodiment of a color filter in accordance with the present invention.

It is to be noted that for clarification the elements of the figures are drawn without considering the relative dimensions therebetween.

BEST MODE FOR CARRYING OUT THE INVENTION

The detailed description of the present invention is made with reference to the drawings hereinbelow.

A glass plate or a synthetic resin plate which is normally used for a liquid crystal display device is used as a transparent substrate 1.

An activated film layer 2 made of a metal oxide such as an activated alumina or an activated silica is formed on the transparent substrate 1 (shown in FIG. 3-a). Activated alumina ($\chi$-$Al_2O_3$·$nH_2O$, $\gamma$-$Al_2O_3$·$nH_2O$, $\eta$-$Al_2O_3$·$nH_2O$, $\delta$-$Al_2O_3$·$nH_2O$), activated silica ($SiO_2$·$nH_2O$) and the like are used as an activated film layer 2. The method for forming the activated film layer 2 on the surface of the transparent substrate 1 is described taking activated alumina or activated silica as an example. First, the element of alumina colloid or silica colloid or a mixture thereof is applied to the surface of the transparent substrate 1 using a spray method, dipping method, bar coating method, or screen printing method. After the substance (colloid) for the activated film layer 2 is dried, it is calcined at 350°~850° C. for 10~180 minutes. The activated film layer 2 thus formed is transparent and has many pores whose diameters are approximately a few nm ~100 nm and the surface roughness (variation in distance between the top surface of the activated film layer 2 and bottom surface thereof) is 0.1 $\mu$m or below. Accordingly, the surface of the activated film layer 2 is smooth and has a high adsorbing performance. The dye permeates into the pores. Favorably, the thickness of the activated film layer 2 is 0.5~10 $\mu$m and more favorably it is 1.5~5.0 $\mu$m, considering transparence, surface hardness, and dye receptivity etc. If the thickness of the activated film layer 2 is more than the above-described thickness, the activated film layer 2 is whitened so that it becomes opaque or a crack occurs therein easily. If its thickness is below the above-described thickness, the dye does not permeate thereinto preferably, i.e., a favorable quantity of the dye cannot be obtained.

Thereafter, the dye is adsorbed by the activated film layer 2 formed on the transparent substrate 1 to form a color pattern (shown in FIG. 3-b). A sublimation dye or a dye which is capable of hot-melting and vaporizing can be used as the dye. Specifically speaking, a disperse dye, oil-soluble dye not containing a metal, a cationic dye or a mixture thereof is used.

In order to form a color pattern by permeating the dye into the pores, the dye in an ink is heated at temperatures suitable for allowing the dye to thermally move in the pores of the activated film layer 2. Heating conditions differ depending on dyes, for example, the dye is heated at 100°~300° C. for a few seconds to 60 minutes under atmospheric pressure or under a reduced pressure. A metal masking method (a metal plate having window portions in the shape of a color pattern is placed on the activated film layer 2, and then, a transfer sheet having an ink layer containing a dye is placed on the metal plate, and the dye on the transfer sheet are is so that the dye permeates into the activated film layer 2); a sublimation transfer method (transfer sheet on which a color pattern is formed by using a dye is placed on the activated film layer 2 so that the dye on the transfer sheet is heated to permeate the dye into the activated film layer 2); a direct printing method (an ink containing a dye is directly printed on the activated film layer 2, and the dye on the activated film layer 2 is heated so that the dye permeates into the activated film layer 2, and then, excess ink layer is removed) and so on are used as means for allowing the permeation of the dye into the activated film layer 2 so as to form a pattern therein, respectively.

The configurations of color patterns are designed depending on the use of color patterns. For example, in the case of describing a dot pattern, it is a color pattern formed by sequentially, separately permeating two or more dyes of different colors into an activated film layer. According to this method, transparent electrodes formed on an overcoating layer 4 which is described later correspond to respective color patterns formed in the activated film layer, and the color patterns formed in the activated film layer and the patterns of the transparent electrodes coincide with each other. When the color patterns are the three primary colors, namely, red R, green G, and blue B, a display device using the color filter thus formed is capable of displaying all colors.

The pores formed in the activated film layer 2 are sealed as necessary. The sealing of the pores prevents the diffusion of the dye which has permeated thereinto and also prevents pollution which is caused by foreign matter. For example, the pores can be sealed by immersing the transparent substrate 1 on which the activated film layer 2 has been formed in warm water of more than 90° C. or a water solution of nickel acetate more than 90° C. The pores can also be sealed by steam.

Thereafter, a thin metal film pattern 3 which acts as a black mask is formed on the activated film layer 2. First, a photosensitive resist is applied to the surface of the activated film layer 2 and a black mask of a desired pattern is exposed, and then, a resist layer 5 is formed on the activated film layer 2 at a portion thereof where the formation of the black mask is not required (shown in FIG. 3-c). The resist layer 5 may be formed by a printing method using an alkali-soluble resist.

Thereafter, a catalyst 6 is adsorbed into the activated film layer 2 (shown in FIG. 3-d). The catalyst 6 permeates into the pores of the activated film layer 2 and is adsorbed by the activated film layer 2 by bringing the transparent substrate 1 into contact with a solution containing the catalyst by means of, immersion etc. For example, tin-palladium catalyst can be used as the catalyst 6. Catalysts available on the market for carrying out an electroless plating can serve the purpose. The catalyst 6 is suitably selected according to a metal to be employed in an electroless plating to be effected thereafter. The catalyst 6 which has been adsorbed by the activated film layer 2 is colorless and transparent.

Thereafter, the transparent substrate 1 is washed by water and immersed in an alkaline or acid solution which is strong to such an extent that it does not remove the resist layer 5 from the activated film layer 2 so that the catalyst 6 is reduced and metalized. The metalized catalyst 6 acts as a plating core when the transparent substrate 1 is subjected to an electroless plating in the following process. A solution containing 1 to 10 wt % of sodium hydroxide or a solution containing 1 to 10 wt % of potassium hydroxide can be used as an alkaline solution. A solution containing 5 to 20 wt % of sulfuric acid can be used as an acidic solution. Accelerators, for use in an electroless plating, available on the market can be used as alkali and acid. An accelerator is suitably selected depending on a metal to be used in performing an electroless plating.

Thereafter, after the transparent substrate 1 is washed by water, the transparent substrate 1 is immersed in an electroless plating solution and an electroless plating is effected in the electroless plating solution to form a thin metal film 7 (shown in FIG. 3-e). Metals which can be used for the electroless plating are selected from nickel, copper, cobalt, tin, platinum, gold, silver or an alloy of these metals. When nickel which is superior in light-intercepting performance and forms a strong thin metal film 7 and is not expensive is used, it is preferable that the thickness of the thin metal film 7 ranges from 500 to 3,000 Å. The catalyst 6 does not permeate into the pores of the activated film layer 2 on which the resist layer 5 has been formed. Accordingly, only the portion which requires the formation of the black mask is subjected to the electroless plating.

Thereafter, the resist layer 5 is removed from the activated film layer 2 (shown in FIG. 3-f). Thus, the thin metal film pattern 3 which has been formed by the electroless plating adheres strongly to the activated film layer 2 at the portion where the resist layer 5 has not been formed.

The thin metal film pattern 3 can be formed by the following method as well (shown in FIG. 4). First, the catalyst 6 permeates into the entire surface of the activated film layer 2 where a color pattern has been formed (shown in FIG. 4-c) in accordance with the above-described method. Thereafter, in a manner similar to the above-described method, an electroless plating is effected to form the thin metal film 7 on the entire surface of the activated film layer 2 (shown in FIG. 4-d). Thereafter, the surface of the thin metal layer 7 is coated with a photosensitive resist, and then, the pattern of a black mask is exposed to form the resist layer 5 on the thin metal film 7 at a portion which requires the formation of the black mask (shown in FIG. 4-e). Thereafter, the transparent substrate 1 is immersed in a solution of a dilute nitric acid or a ferric chloride to etch the thin metal film 7. Thus, the thin metal film pattern 3 is formed (shown in FIG. 4-f). After washing by water, the resist layer 5 is removed from the thin metal film pattern 3 (shown in FIG. 4-g). In this manner, the thin metal film pattern 3 similar to the one as described above can be formed.

The thin metal film pattern 3 can be also formed by the following method (shown in FIG. 5). First, the surface of the activated film layer 2 in which a color pattern has been formed is coated with a photosensitive resist. Thereafter, the predetermined pattern of a black mask is exposed, and then, the resist layer 5 is formed on the activated film layer 2 at a portion which does not require the formation of the black mask (shown in FIG. 5-c). After immersing in a solution containing a catalyst, it allows the activated film layer 2 is allowed to adsorb the catalyst 6 (shown in FIG. 5-d). The catalyst 6 is adsorbed by the activated film layer 2 at a portion at which the resist layer 5 has not been formed, and then, the resist layer 5 is removed (shown in FIG. 5-e) from the activated film layer 2. Thereafter, the transparent substrate 1 is washed by water, and then, the transparent substrate 1 on which the activated film layer 2 has been formed is immersed in an electroless plating bath. As a result, the thin metal film pattern 3 is formed (shown in FIG. 5-f). The thin metal film pattern thus formed is similar to those formed by the above-described two methods.

Thus, the black mask is formed using the thin metal film pattern 3. The thin metal film pattern 3 which intercepts a light incident between pixels of the color filter is lattice-shaped or formed in parallel with each other so that the pixels are partitioned every one line.

Thus, the color filter having the black mask can be obtained.

Figure 2:
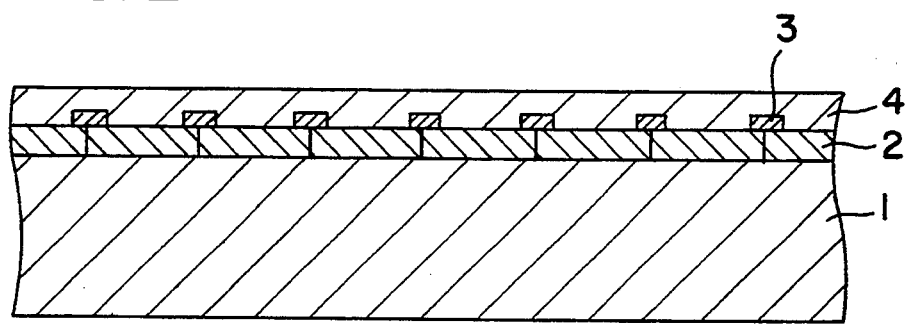
FIG. 2 is a sectional view showing another embodiment of a color filter in accordance with the present invention.
Figure 3A:
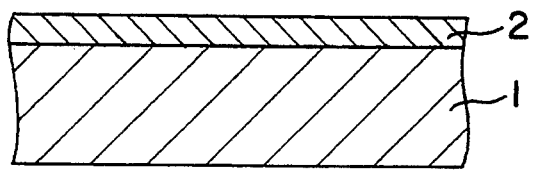
FIG. 3 is a sectional view showing the process of manufacturing a color filter in accordance with the present invention.
Figure 3B:
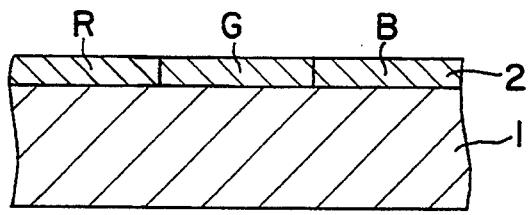
Figure 3C:
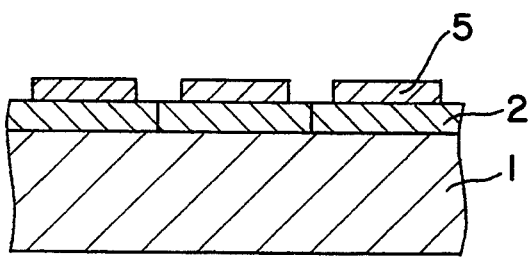
Figure 3D:
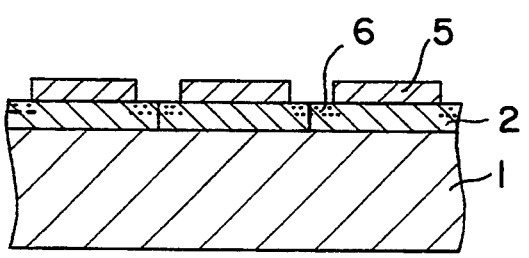
Figure 3E:
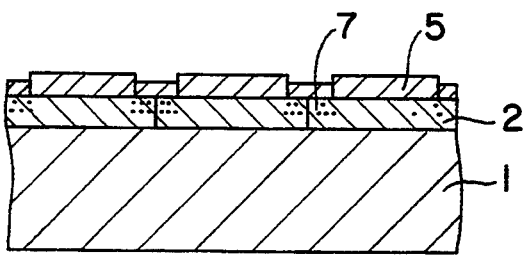
Figure 3F:
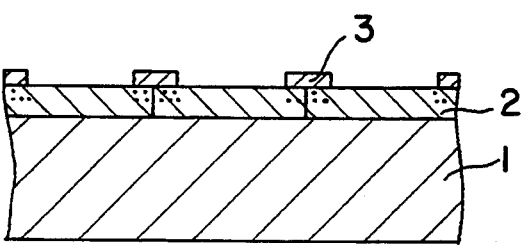
Figure 4A:
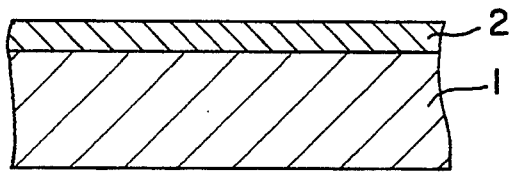
FIGS. 4 and 5 are sectional views showing a different process of manufacturing a color filter in accordance with the present invention.
Figure 4B:
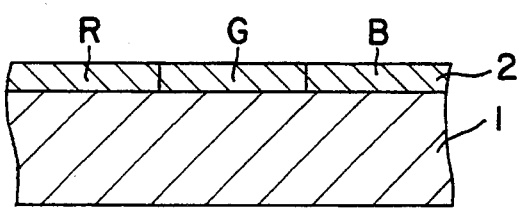
Figure 4C:
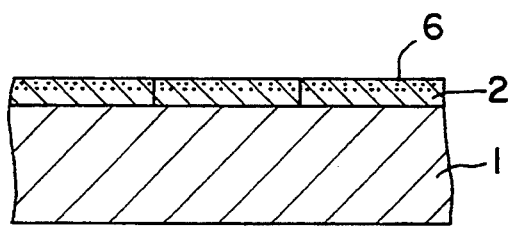
Figure 4D:
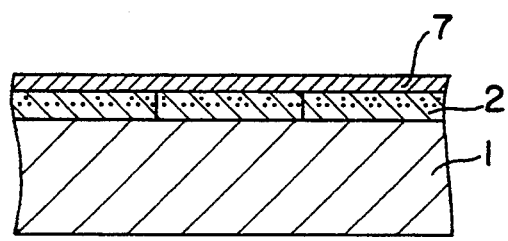
Figure 4E:
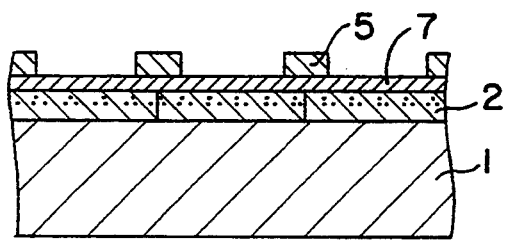
Figure 4F:
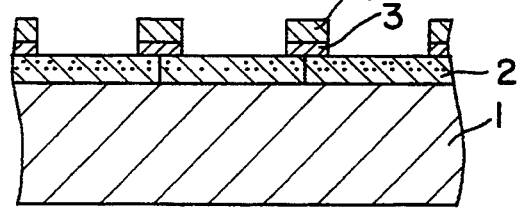
Figure 4G:
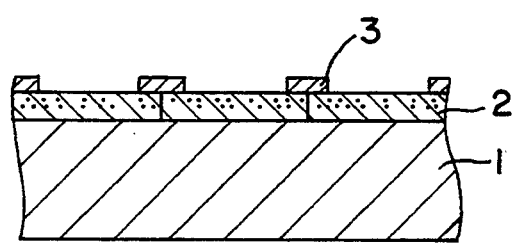
Figure 5A:
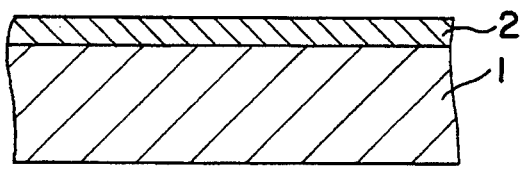
Figure 5B:
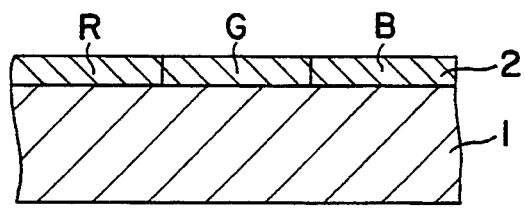
Figure 5C:
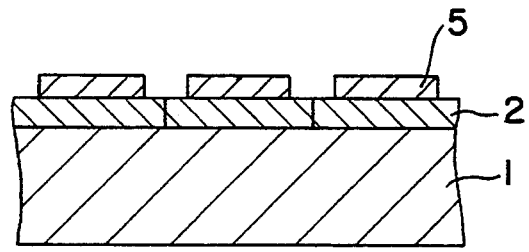
Figure 5D:
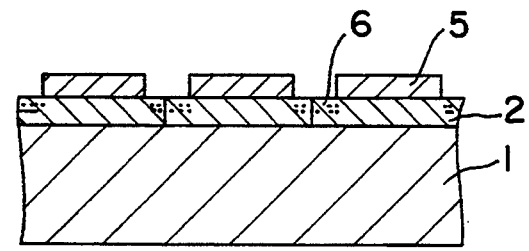
Figure 5E:
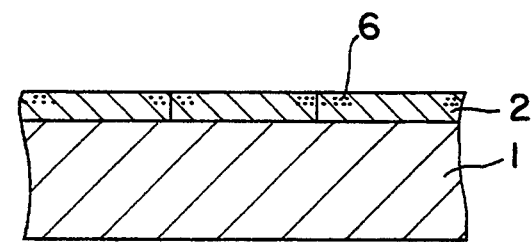
Figure 5F:
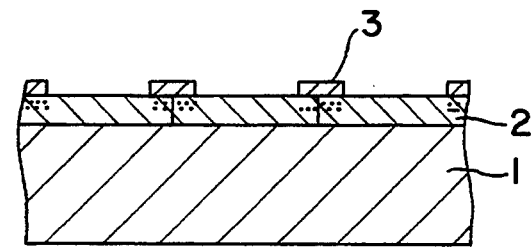

An overcoating layer 4 formed on the activated film layer 2 on which the thin metal pattern 3 has been formed may be formed as necessary (shown in FIG. 2). The following can be used as the material for the overcoating layer 4: Acrylic resin, melamine resin, epoxy resin, silicone resin, unsaturated polyester resin, isocyanurate resin, polyimide resin and resins which are hard and superior in transparency such as ultraviolet-curing resin. After the surface of the activated film layer 2 is coated with the resin, the resin is hardened. The overcoating layer 4 can also be formed by coating with inorganic material such as sodium silicate or lithium silicate, and then, heating it. The overcoating layer 4 prevents the molecules of a dye which has permeated into the pores formed in the activated film layer 2 from diffusing and being polluted by foreign matter, and further, is effective for improving the smoothness of the surface of the color filter. When the color filter in accordance with the present invention is covered with a transparent electrode in a subsequent process, it is preferable that the overcoating layer 4 is composed of a substance which is superior in adhering to the substance composing the transparent electrode so that the color filter and the transparent electrode adhere to each other. The transparent electrode is formed such that it covers the overcoating layer 4 partially or entirely.

The embodiments of the present invention are described hereinbelow.

First Embodiment

Almina sol-200 (manufactured by Nissan Chemical Industries Co., Ltd.) is sprayed on the surface of a transparent glass plate which has been washed in an alkaline solution. After the almina sol-200 was dried at 70° C. for five minutes, it is calcined at 550° C. for 45 minutes to form an activated film layer having the thickness of approximately 2 μm on the surface of the glass plate.

Screen printings were performed on sheets using three screen inks having the following composition. As a result, transfer sheets in red, green, and blue were obtained.

| | (percentage by weight) |
|---|---|
| 1. Red ink | |
| Ethyl cellulose N-7 (manufactured by Hercules Inc.) | 15 |
| Ethyl cellulose N-22 (manufactured by Hercules Inc.) | 5 |
| Waxoline red YP (manufactured by Imperial Chemical Industries Ltd.) | 8 |
| Butyl cellosolve | 22 |
| Butyl cellosolve acetate | 20 |
| Solvesso 150 | 30 |
| 2. Green ink | |
| Ethyl cellulose N-7 (manufactured by Hercules Inc.) | 15 |

-continued

|  | (percentage by weight) |
| --- | --- |
| Ethyl cellulose N-22 (manufactured by Hercules Inc.) | 5 |
| Oleosol Fast yellow 5G (manufactured by Taoka Chemical Co., Ltd.) | 8 |
| Miketon polyester green G (Mitsui Toatsu Chemicals Co., Ltd.) | 4 |
| Butyl cellosolve | 20 |
| Butyl cellosolve acetate | 20 |
| Solvesso 150 | 28 |
| 3. Blue ink | |
| Ethyl cellulose N-7 (manufactured by Hercules Inc.) | 15 |
| Ethyl cellulose N-22 (manufactured by Hercules Inc.) | 5 |
| Kaloyan polyester blue TS (manufactured by Nippon Kayaku Co., Ltd.) | 10 |
| Butyl cellosolve | 20 |
| Butyl cellosolve acetate | 20 |
| Solvesso 150 | 30 |

Three stainless steel masks having the thickness of 0.03 mm and pores corresponding to a predetermined color pattern were prepared. Thereafter, the glass plate manufactured by the above-described method was heated at 180° C. Thereafter, a metal mask for a blue ink was placed on the glass plate at a predetermined position thereof. A blue transfer sheet was placed on the metal mask, and then, heated under the pressure of one torr for a minute with a silicon rubber which has the hardness of 50 designated by JIS standard and was heated at 180° C. Thereafter, the transfer sheet and the metal mask were removed from the glass plate. As a result, a blue color pattern corresponding to the pattern of the metal mask was transferred to the activated film layer. Thereafter, a metal mask for a green ink was placed on the glass plate at a predetermined position thereof different from the position in which the blue color pattern has been transferred to the activated film layer. The green transfer sheet was superimposed on the metal mask, and then, heated for 40 seconds at 180° C. and under the pressure of 50 torr. As a result, the green color pattern was transferred to the activated film layer. Thereafter, using a metal mask for a red ink and a red transfer sheet, the transfer sheet was heated at 180° C. for thirty seconds and under the pressure of 100 torr similarly to the above-described manner so as to transfer the red color pattern to the activated film layer. Thus, the color pattern in the three primary colors was formed on the activated film layer.

Thereafter, the activated film layer on which the color patterns in the three primary colors were formed was coated with an ultraviolet-sensitive resist, and then, the predetermined pattern of the black mask was exposed. Then, the resist applied to the portion which requires the formation of the black mask was removed.

Thereafter, 1 g of palladium chloride and 5 g of stannous chloride were dissolved in a solution consisting of 300 ml of hydrochloric acid and 600 ml of water. The solution was left overnight, and then, the glass plate was immersed in a solution, containing a catalyst, prepared by dissolving 50 g of stannous chloride in the solution left overnight.

After the glass plate was washed by water, it was immersed in an alkaline solution strong to such an extent that it does not remove the resist layer from the activated film layer. Then, the glass plate was washed by water, and then, a nickel plating was effected in an electroless plating bath. After the electroless plating was completed, the resist layer was removed.

Thereafter, the thin metal film pattern formed on the glass plate was overcoated with an overcoating agent composed of the following substance, and then, a heat treatment was effected at 180° C. for 15 minutes.

| overcoating agent | percentage by weight |
| --- | --- |
| melamine resin | 5 |
| acrylic resin | 10 |
| water | 85 |

Thus, the color pattern in the three primary colors having a black mask was obtained.

Second Embodiment

Similarly to the first embodiment, a glass plate having a color pattern in the three primary colors formed in an activated film layer was obtained.

Thereafter, similarly to the first embodiment, a thin metal film layer was formed entirely on the surface of the glass plate, and then, the surface of the thin metal layer was coated with an ultraviolet-sensitive resist. Thereafter, the predetermined pattern of a black mask was exposed, and then, a resist applied to a portion which does not require the formation of the black mask was removed. Then, the glass plate was immersed in a dilute nitric acid so as to etch it. Thus a thin metal film pattern was formed. After it was washed by water, the resist was removed from the thin metal film layer.

Thereafter, similarly to the first embodiment, an overcoating layer was formed on the thin metal film pattern formed on the glass plate. Thus, a color filter in the three primary colors having a black mask was obtained.

Third Embodiment

Similarly to the first embodiment, a glass plate having an activated film layer thereon in which a color pattern in the three primary colors was formed was obtained. The glass plate was immersed for 15 minutes in a water solution of nickel acetate whose temperature was 95° C., and then, pores formed in the activated film layer were sealed.

Thereafter, similarly to the first embodiment, a resist layer was formed on the glass plate at a portion which does not require the formation of a black mask. Thereafter, the glass plate was immersed in a solution containing a catalyst.

After being by water, the resist layer was removed from the glass plate, and then, an electroless plating was effected to form a thin metal film pattern.

Next, similarly to the first embodiment, an overcoating layer was formed on the thin metal film pattern formed on the glass plate. Thus, a color filter in the primary three colors having a black mask was obtained.

INDUSTRIAL APPLICABILITY

As described above, since the color filter in accordance with the present invention has a thin metal film pattern, namely, a black mask directly formed on the activated film layer, a specular reflection does not occur. Accordingly, the color filter integrated into display devices such as a liquid crystal display device is capable of displaying an image having a high contrast.

The method for forming the color filter in accordance with the present invention is easily capable of forming a color filter capable of displaying an image having a high contrast.

What is claimed is:

1. A method for forming a color filter comprising the steps of:
   (a) forming a porous transparent activated film layer by applying a colloid selected from the group consisting of $\chi$-$Al_2O_3 \cdot nH_2O$, $\gamma$-$Al_2O_3 \cdot nH_2O$, $\eta$-$Al_2O_3 \cdot nH_2O$, $\delta$-$Al_2O_3 \cdot nH_2O$, $SiO_2 \cdot nH_2O$ and a mixture thereof on a transparent substrate and baking said colloid;
   (b) permeating a dye into said activated film layer to form a color pattern;
   (c) forming a resist layer at a portion, of said activated film layer, which does not require the formation of a black mask;
   (d) bringing a solution containing a catalyst into contact with said activated film layer so that said activated film layer adsorbs the solution containing the catalyst;
   (e) performing an electroless plating to form a thin metal pattern, as a black mask, reverse to that of a resist layer; and
   (f) removing said resist layer.

2. A method for forming a color filter as claimed in claim 1, wherein an overcoating is performed after the step (f).

3. A method for forming a color filter as claimed in claim 1, wherein a pore-sealing treatment is performed between the step (b) and the step (c).

4. A method for forming a color filter comprising the steps of:
   (a) forming a porous transparent activated film layer by applying a colloid selected from the group consisting of $\chi$-$Al_2O_3 \cdot nH_2O$, $\gamma$-$Al_2O_3 \cdot nH_2O$, $\eta$-$Al_2O_3 \cdot nH_2O$, $\delta$-$Al_2O_3 \cdot nH_2O$, $SiO_2 \cdot nH_2O$ and a mixture thereof on a transparent substrate and baking said colloid;
   (b) permeating a dye into said activated film layer to form a color pattern;
   (c) bringing a solution containing a catalyst into contact with said activated film layer so that said activated film layer adsorbs the solution containing the catalyst;
   (d) performing an electroless plating to form a thin metal film layer on said activated film layer;
   (e) forming a resist layer at a portion, of said thin metal film layer, which requires the formation of a black mask;
   (f) etching said thin metal film layer to form a thin metal film pattern; and
   (g) removing said resist layer.

5. A method for forming a color filter as claimed in claim 4, wherein an overcoating is effected after the step (g).

6. A method for forming a color filter as claimed in claim 4, wherein a pore-sealing treatment is performed between the step (b) and the step (c).

7. A method for forming a color filter comprising the steps of:
   (a) forming a porous transparent activated film layer by applying a colloid selected from the group consisting of $\chi$-$Al_2O_3 \cdot nH_2O$, $\gamma$-$Al_2O_3 \cdot nH_2O$, $\eta$-$Al_2O_3 \cdot nH_2O$, $\delta$-$Al_2O_3 \cdot nH_2O$, $SiO_2 \cdot nH_2O$ and a mixture thereof on a transparent substrate and baking said colloid;
   (b) permeating a dye into said activated film layer to form a color pattern;
   (c) forming a resist layer at a portion, of said activated film layer, which does not require the formation of a black mask;
   (d) bringing a solution containing a catalyst into contact with said activated film layer so that said activated film layer adsorbs the solution containing the catalyst;
   (e) removing said resist layer; and
   (f) performing an electroless plating to form a thin metal pattern as a black mask.

8. A method for forming a color filter as claimed in claim 7, wherein an overcoating is performed after the step (f).

9. A method for forming a color filter as claimed in claim 7, wherein a pore-sealing treatment is performed between the step (b) and the step (c).

10. A method for forming a color filter comprising the steps of:
    (a) forming a porous transparent activated film layer by applying a colloid selected from the group consisting of $\chi$-$Al_2O_3 \cdot nH_2O$, $\gamma$-$Al_2O_3 \cdot nH_2O$, $\eta$-$Al_2O_3 \cdot nH_2O$, $\delta$-$Al_2O_3 \cdot nH_2O$, $SiO_2 \cdot nH_2O$ and a mixture thereof on a transparent substrate and baking said colloid, wherein said activated film layer is an aluminum or silicon oxide film layer having plural pores whose diameters are approximately from a few nm to 100 nm;
    (b) permeating a dye into said activated film layer to form a color pattern;
    (c) forming a resist layer at a portion, of said activated film layer, which does not require the formation of a black mask;
    (d) bringing a solution containing a catalyst into contact with said activated film layer so that said activated film layer adsorbs the solution containing the catalyst;
    (e) performing an electroless plating to form a thin metal pattern, as a black mask, reverse to that of a resist layer; and
    (f) removing said resist layer.

11. A method for forming a color filter comprising the steps of:
    (a) forming a porous transparent activated film layer by applying a colloid selected from the group consisting of $\chi$-$Al_2O_3 \cdot nH_2O$, $\gamma$-$Al_2O_3 \cdot nH_2O$, $\eta$-$Al_2O_3 \cdot nH_2O$, $\delta$-$Al_2O_3nH_2O$, $SiO_2 \cdot nH_2O$ and a mixture thereof on a transparent substrate and baking said colloid, wherein said activated film layer is an aluminum or silicon oxide film layer having plural pores whose diameters are approximately from a few nm to 100 nm;
    (b) permeating a dye into said activated film layer to form a color pattern;
    (c) bringing a solution containing a catalyst into contact with said activated film layer so that said activated film layer adsorbs the solution containing the catalyst;
    (d) performing an electroless plating to form a thin metal film layer on said activated film layer;
    (e) forming a resist layer at a portion, of said thin metal film layer, which requires the formation of a black mask;
    (f) etching said thin metal film layer to form a thin metal film pattern; and
    (g) removing said resist layer.

12. A method for forming a color filter comprising the steps of:
- (a) forming a porous transparent activated film layer by applying a colloid selected from the group consisting of $\chi\text{-}Al_2O_3 \cdot nH_2O$, $\gamma\text{-}Al_2O_3 \cdot nH_2O$, $\eta\text{-}Al_2O_3 \cdot nH_2O$, $\delta\text{-}Al_2O_3 \cdot nH_2O$, $SiO_2 \cdot nH_2O$ and a mixture thereof on a transparent substrate and baking said colloid, wherein said activated film layer is an aluminum or silicon oxide film layer having plural pores whose diameters are approximately from a few nm to 100 nm;
- (b) permeating a dye into said activated film layer to form a color pattern;
- (c) forming a resist layer at a portion, of said activated film layer, which does not require the formation of a black mask;
- (d) bringing a solution containing a catalyst into contact with said activated film layer so that said activated film layer adsorbs the solution containing the catalyst;
- (e) removing said resist layer; and
- (f) performing an electroless plating to form a thin metal pattern as a black mask.

* * * * *